(12) United States Patent
Willard

(10) Patent No.: US 11,241,944 B2
(45) Date of Patent: Feb. 8, 2022

(54) VEHICLE ROOF HAVING A ROOF PANEL

(71) Applicant: Webasto SE, Stockdorf (DE)

(72) Inventor: Michael T. Willard, Harrison Township, MI (US)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 16/709,459

(22) Filed: Dec. 10, 2019

(65) Prior Publication Data

US 2021/0170848 A1    Jun. 10, 2021

(51) Int. Cl.
*B60J 7/19* (2006.01)
*B60J 7/11* (2006.01)
*B60J 7/16* (2006.01)

(52) U.S. Cl.
CPC .......... *B60J 7/194* (2013.01); *B60J 7/11* (2013.01); *B60J 7/1664* (2013.01)

(58) Field of Classification Search
CPC .............. B60J 7/194; B60J 7/106; B60J 7/11
USPC .......................................................... 296/218
See application file for complete search history.

(56) References Cited

U.S. PATENT DOCUMENTS

| | | | | |
|---|---|---|---|---|
| 4,792,166 A * | 12/1988 | Shiraishi | ............ | B60J 7/194 292/36 |
| 5,088,777 A * | 2/1992 | Ono | ............ | B60J 7/192 292/150 |
| 6,039,391 A * | 3/2000 | Takahashi | ............ | B60J 7/11 296/218 |
| 9,931,920 B1 * | 4/2018 | Stojkovic | ............ | B60J 7/11 |
| 2019/0270414 A1 * | 9/2019 | Dellock | ............ | B60R 9/058 |
| 2019/0271182 A1 * | 9/2019 | Lovasz | ............ | B60J 7/106 |

* cited by examiner

*Primary Examiner* — Jason S Morrow
(74) *Attorney, Agent, or Firm* — Fitch, Even, Tabin & Flannery, LLP

(57) ABSTRACT

A vehicle roof having a solid roof portion is provided, which is attached to the vehicle body and which delimits a roof opening, and at least one removable roof panel which covers the roof opening when in a closed position and which is detached from the solid roof portion when in an open position, the roof opening thus being uncovered, wherein the roof panel has at least one lock element on either side of a vertical longitudinal center plane of the roof, each lock element interacting with a respective lock slide which can be moved between at least one locking position, in which it retains the roof panel on the solid roof portion and the in roof opening is closed by the roof panel, and an unlocking position, in which the roof panel can be detached from the solid roof portion.

13 Claims, 19 Drawing Sheets

VEHICLE ROOF HAVING A ROOF PANEL

TECHNICAL FIELD

The present disclosure relates to vehicle roof having a solid roof portion attached to the vehicle body and which delimits a roof opening, and specifically, a vehicle roof having at least one removable roof panel which covers the roof opening when in a closed position and which is detached from the solid roof portion when in an open position, the roof opening thus being uncovered.

RELATED ART

Motor vehicles having a vehicle roof with a roof opening which can be closed by a in roof panel are known. Such roof panels may be detachable from the roof structure, i.e. from a solid roof portion of the vehicle roof, and can be stored separately, the roof opening thus being in an uncovered configuration. In a closed position, the roof panel is secured to the solid roof portion and the roof opening is closed. This securement may be by securing screws and clamping elements.

SUMMARY OF THE INVENTION

The object of the present disclosure is to provide embodiments of a vehicle roof having a roof panel which can be secured to a body-attached solid roof portion in a simple manner and which can be detached and removed from the solid roof portion as needed.

According to one approach, this object may be attained by a vehicle roof having a solid roof portion, which is attached to the vehicle body and which delimits a roof opening, and at least one removable roof panel which closes the roof opening when in a closed position and which is detached from the solid roof portion when in an open position, the roof opening thus being uncovered, wherein the roof panel has at least one lock element on either side of a vertical longitudinal center plane of the roof, each lock element interacting with a respective lock slide which can be moved between a locking position, in which each lock element retains the roof panel on the solid roof portion and the roof opening is closed by the roof panel, and an unlocking position, in which the roof panel can be detached from the solid roof portion.

That is, in the vehicle roof according to the present embodiments, the roof panel can be secured or unlocked by actuation or displacement of the bilaterally disposed lock slides. As such, further securing of the roof panels by screws or clamping elements is not required.

According to a specific aspect of the invention, the two lock slides can be driven by a shared drive, which can be realized, in particular, as an electric motor, and which is preferably disposed centrally in the transverse direction of the vehicle roof and forward of or to the rear of the roof opening.

According to another specific aspect, the shared drive can drive two drive cables, each drive cable being connected to one of the two lock slides. The drive cables are according to one approach compression-proof helix cables or compression-proof plastic cables having gear teeth and are engaged with a drive pinion driven by the drive.

According to one approach of the present vehicle roof embodiments described herein, the two lock slides can be guided in a body-attached guide rail to ensure controlled displacement of the two lock slides.

To be able to grip the lock elements of the roof panel, each of the lock slides preferably may have at least one recess on its upper side, the respective lock element engaging into the recess when the roof panel is placed on the solid roof portion and in the closed position.

According to one approach, each recess may have a locking section and an unlocking section. The unlocking section is engaged by the respective lock element when the roof panel is detachable from the solid roof portion. The lock element engages the locking section when the roof panel is in its secured closed position. For this purpose, each recess preferably has a keyhole-shaped outline, the wide portion of the outline forming the unlocking section and the narrow portion of the outline forming the locking section which secures the lock element.

According to another approach, each lock element may be realized as a locking pin having a constriction in the area of which a ramp surface is preferably formed, the ramp surface interacting with the respective lock slide in such a manner that the roof panel is pulled against the solid roof portion as the lock slide is being moved into the locking position.

To ensure smooth displacement of the lock slides, it is advantageous for the lock slides to each have runners, which are guided on a guiding surface, which is preferably formed by a guide rail.

To be able to place the roof panel in its precise position on the solid roof portion, the roof panel preferably may have a retaining tab which engages under a section of the solid roof portion when the roof panel is in the closed position. This section may be formed by one of a rib, a bracket or the like, for example.

A frame which is placed on the guide rails from above may be provided to retain the lock slides in the guide rails. The frame preferably encloses the roof opening and can also form the section of the solid roof portion under which the retaining tab of the roof panel can engage.

Advantageously, the frame has cutouts which are engaged by the lock elements when the roof panel is in the closed position, thus allowing the lock elements to interact with the lock slides.

According to another approach, at least two roof panels may be provided on the vehicle roof. In this case, the lock slide is preferably configured in such a manner that it can move not only into the unlocking position, in which both roof panels are unlocked, but also into a first locking position, in which it retains one roof panel on the solid roof portion and unlocks the other roof panel, and into a second locking position, in which it retains both roof panels on the solid roof portion. The unlocking position and the two locking positions are defined by the position into which the respective lock slide is displaced. For instance, the two locking positions can be realized by one of the roof panels interacting with keyhole-shaped recesses of the lock slide that have a short locking section and the other roof panel interacting with keyhole-shaped recesses of the lock slide that have a long locking section.

Other advantageous aspects of the subject-matter of the present embodiment are apparent from the description, the drawing and the claims.

DETAILED DESCRIPTION OF A PREFERRED EMBODIMENT

Figure 1:
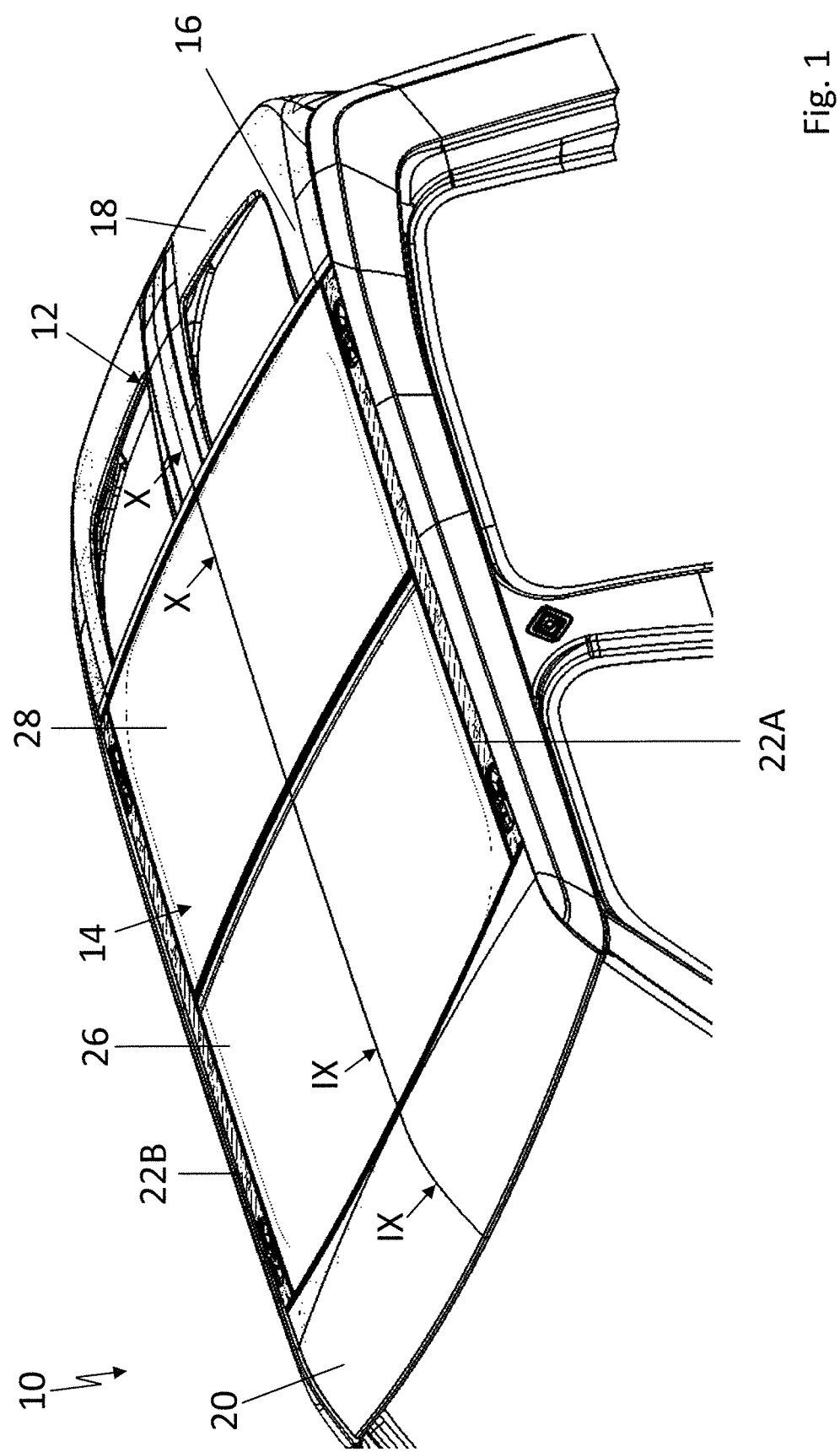
FIG. 1 is a perspective top view of a motor vehicle having a vehicle roof which has a roof opening system having a roof opening and two detachable roof panels, which are in their closed position.
Figure 2:
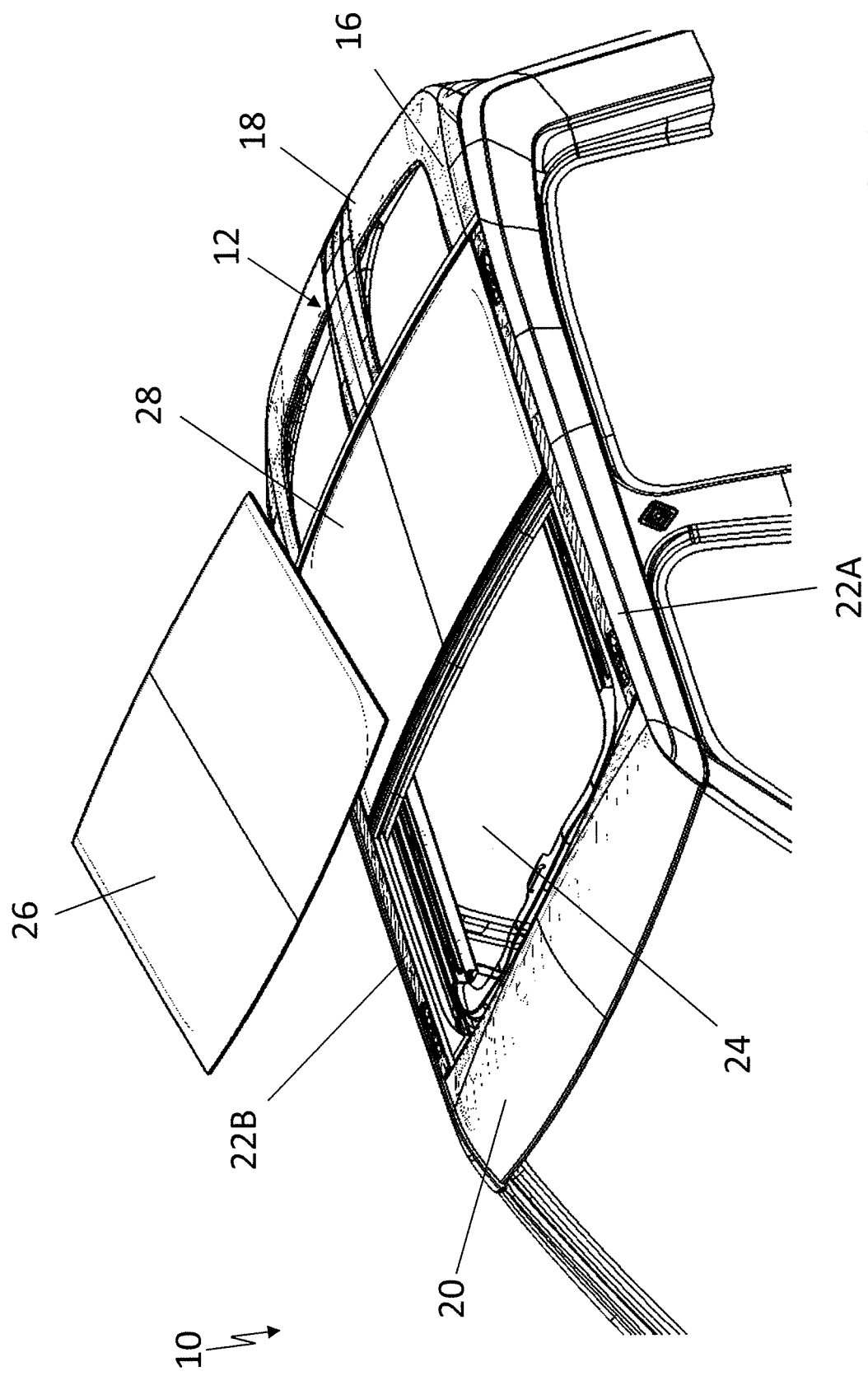
FIG. 2 is a view corresponding to FIG. 1, one of the two roof panels being detached.
Figure 3:
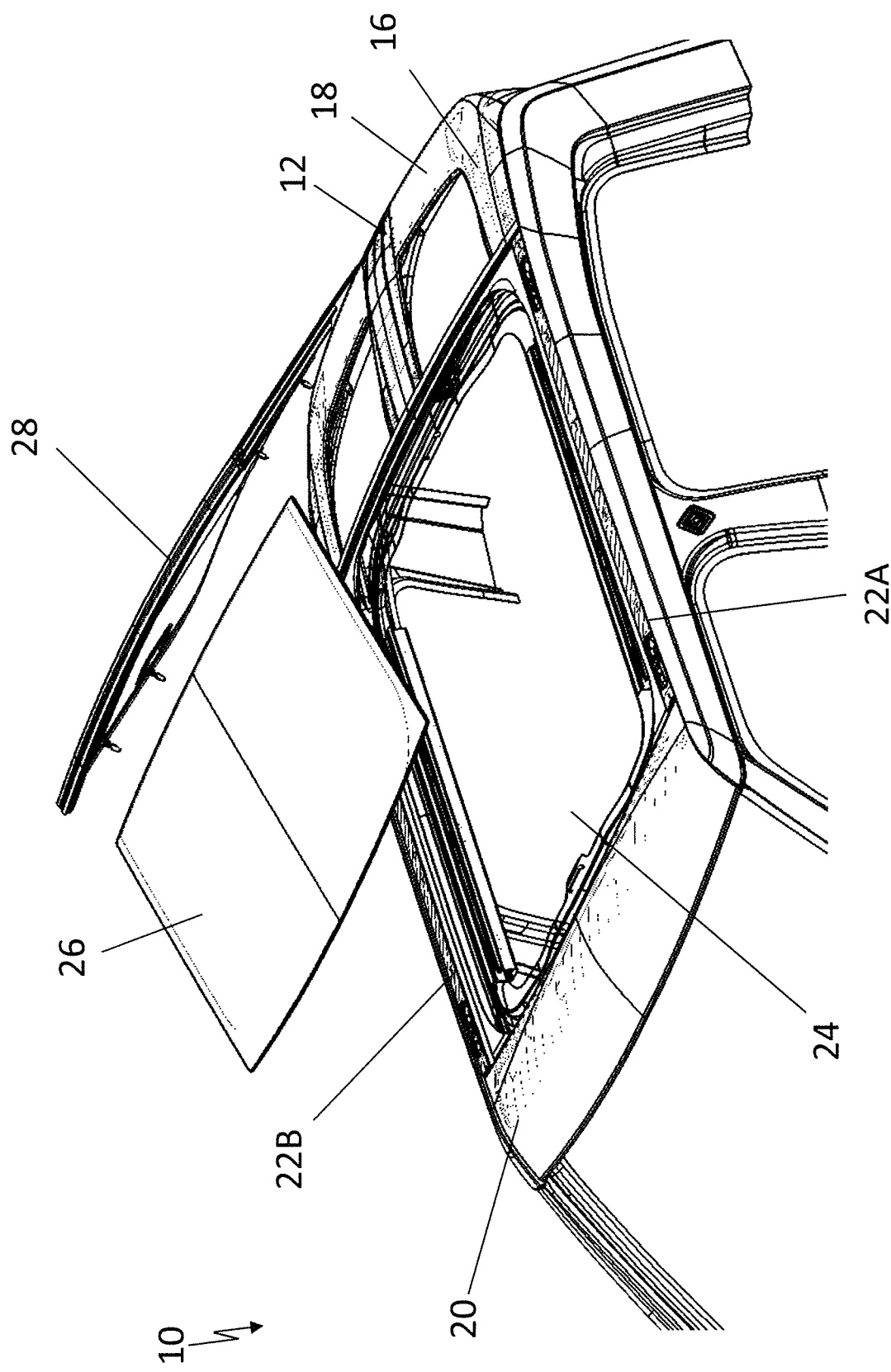
FIG. 3 is a view also corresponding to FIG. 1, both roof panels being detached.
Figure 4:
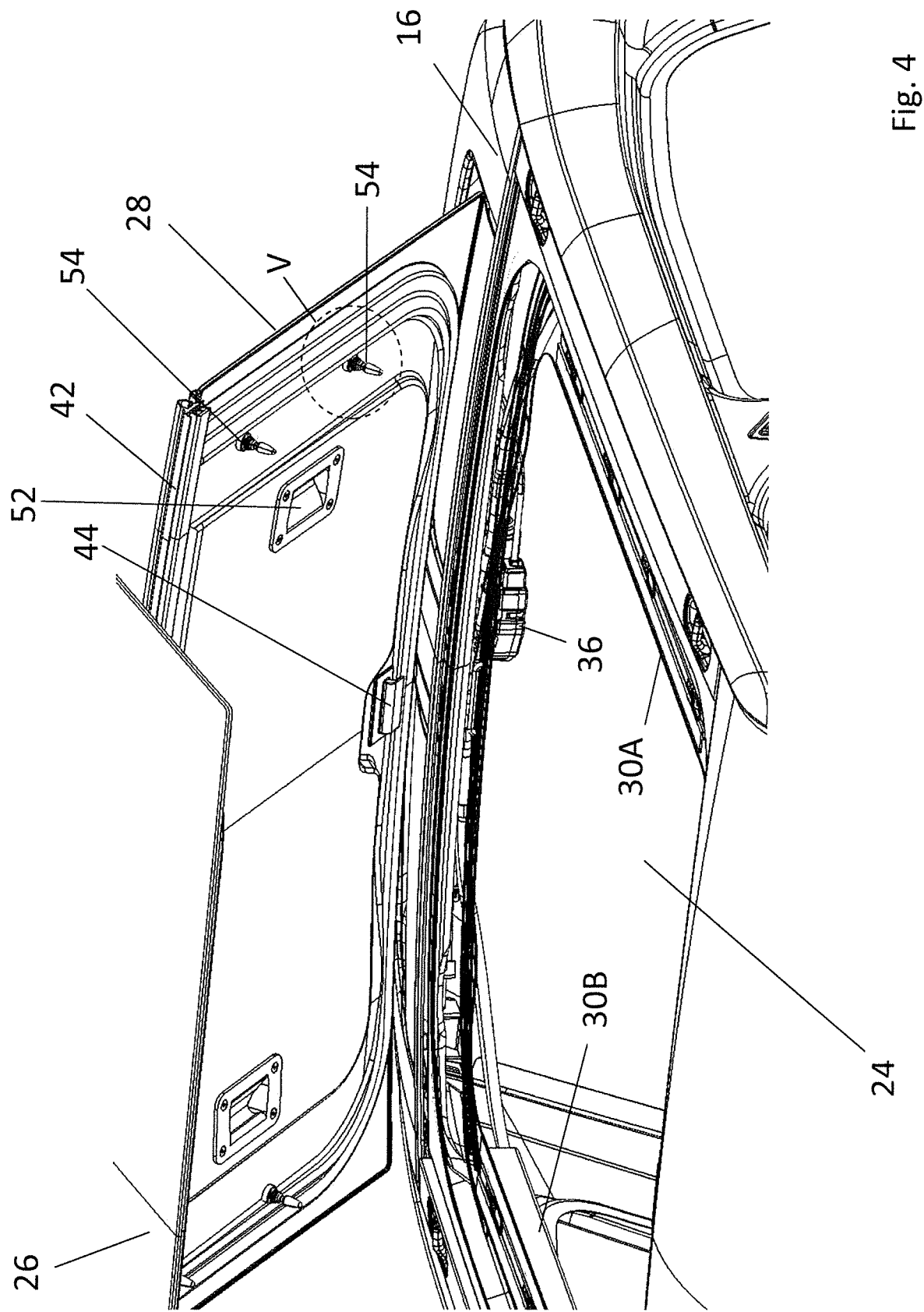
FIG. 4 is an enlarged view of the vehicle roof with the roof panels detached.
Figure 5:
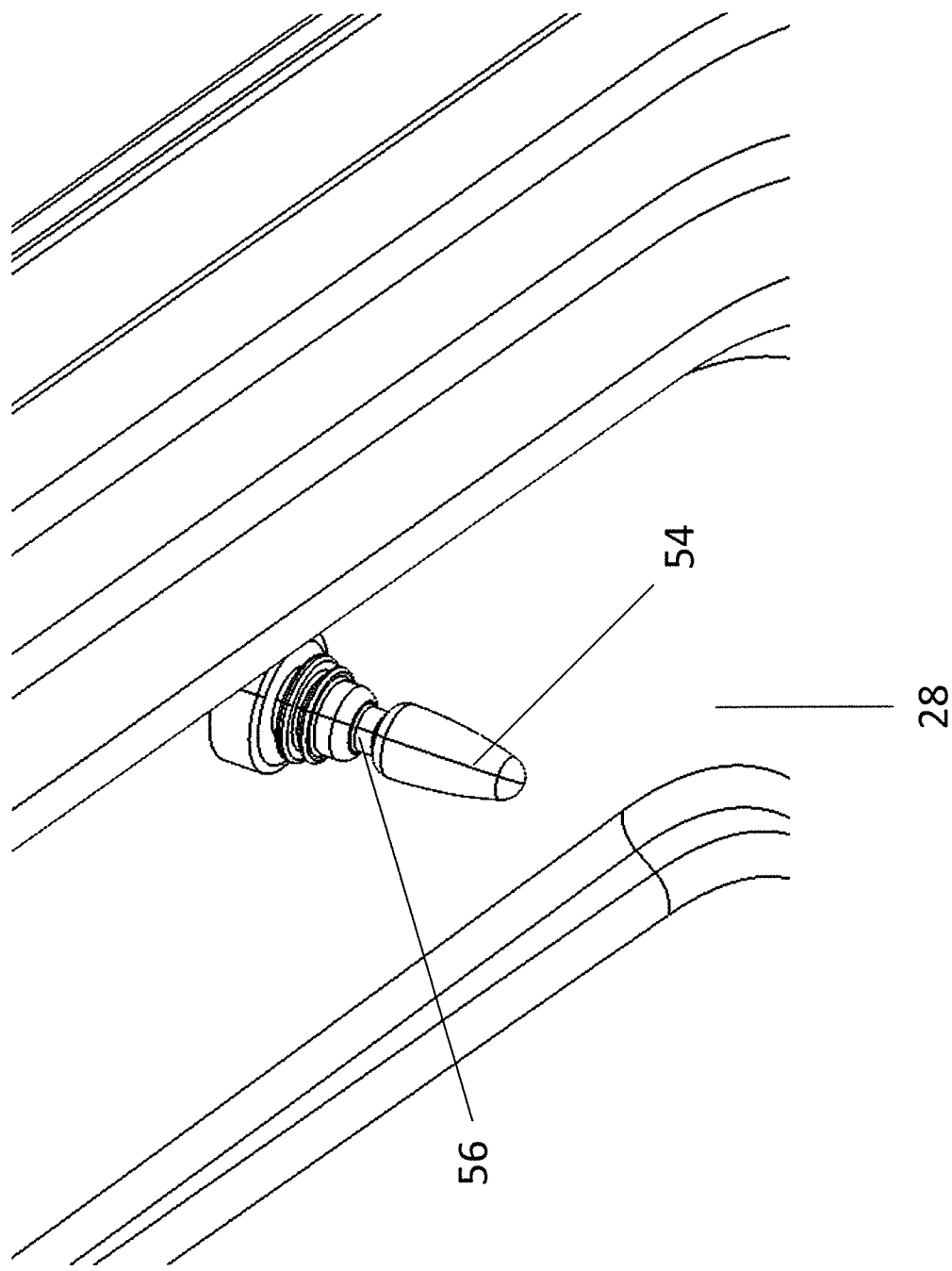
FIG. 5 is an enlarged view of area V in FIG. 4.
Figure 6:
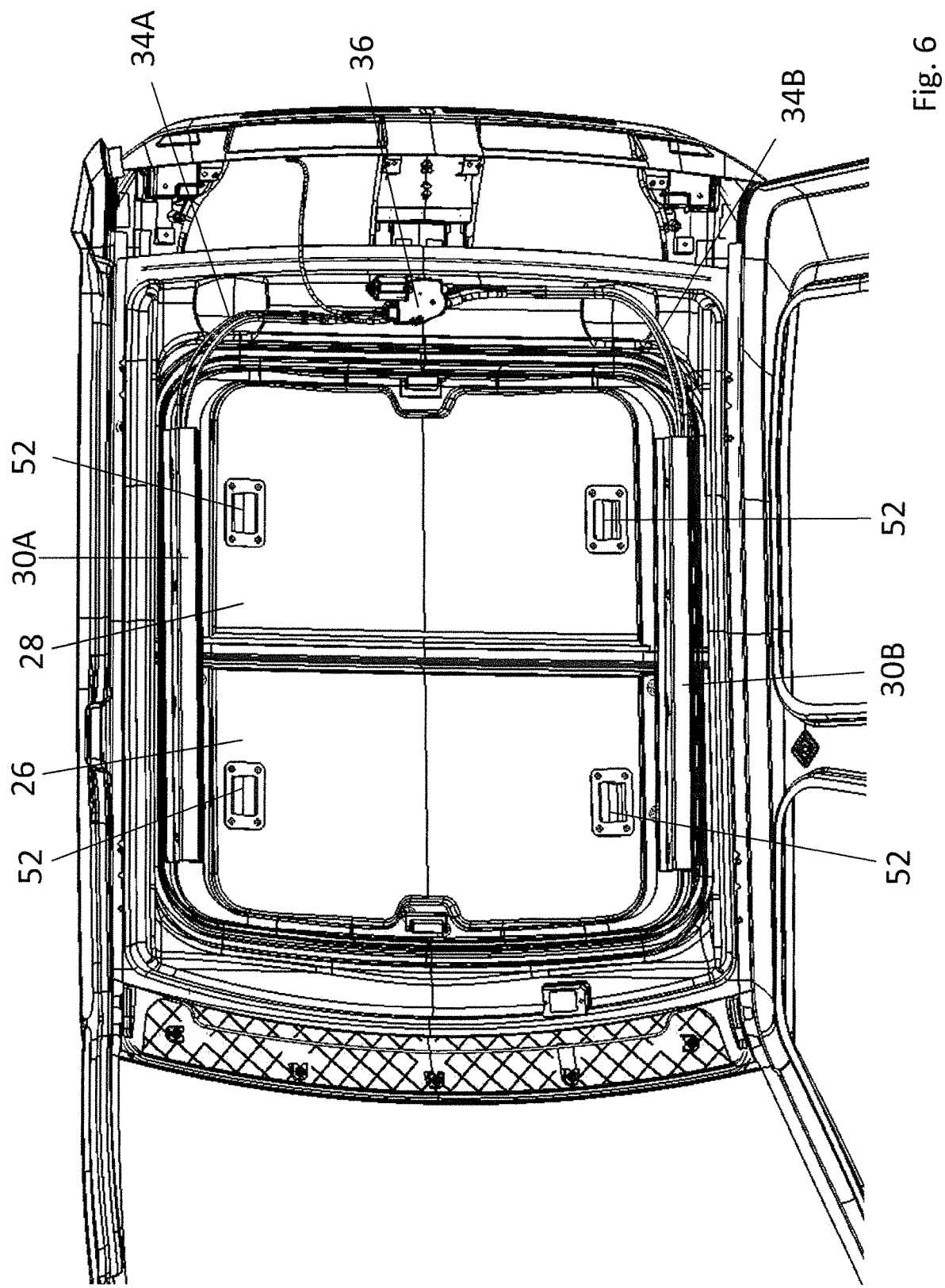
FIG. 6 is a bottom view of the vehicle roof with the roof panels in the closed position.
Figure 7:
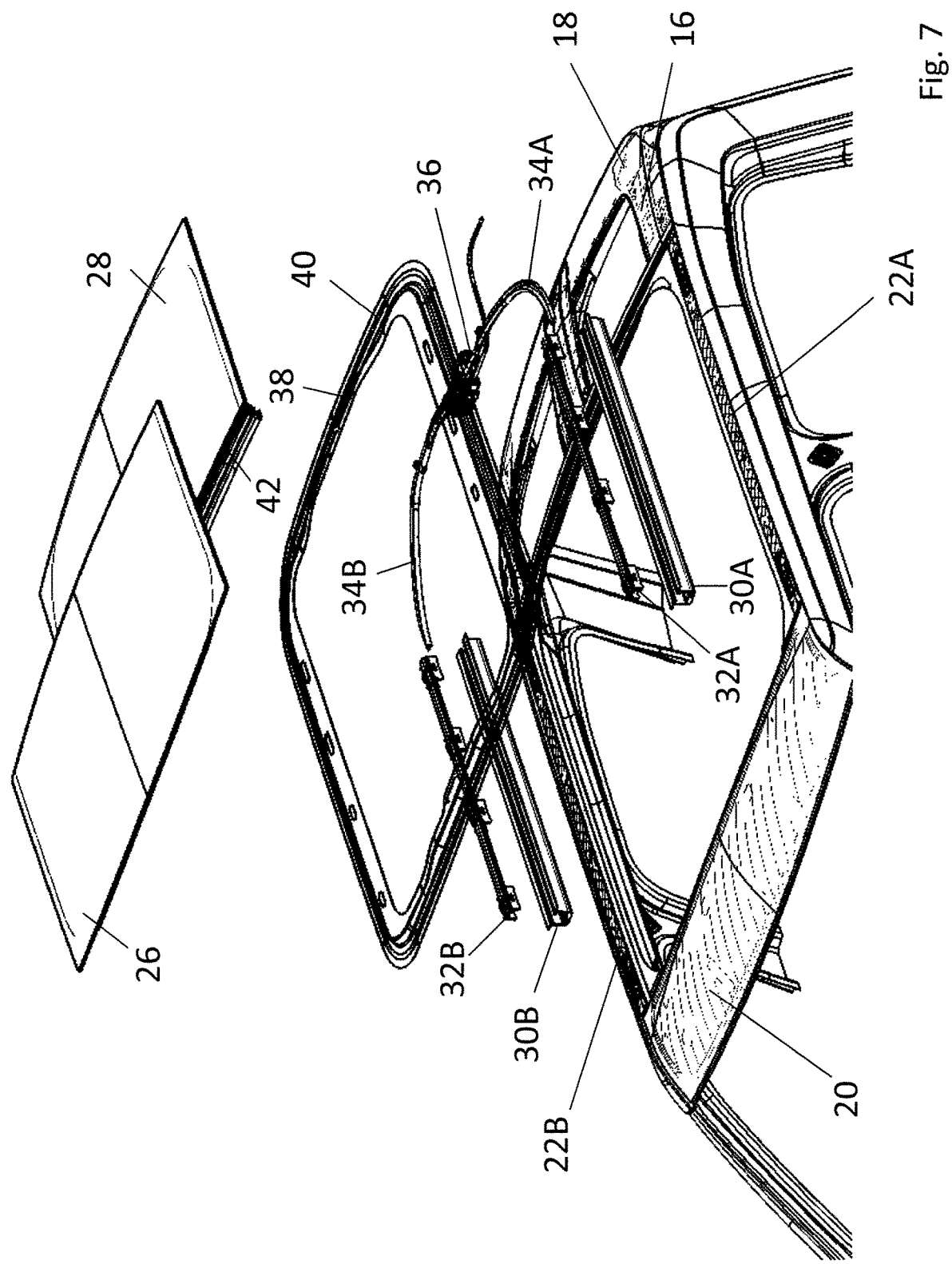
FIG. 7 is an exploded view of the vehicle roof and of the roof opening system of the vehicle roof.
Figure 8:
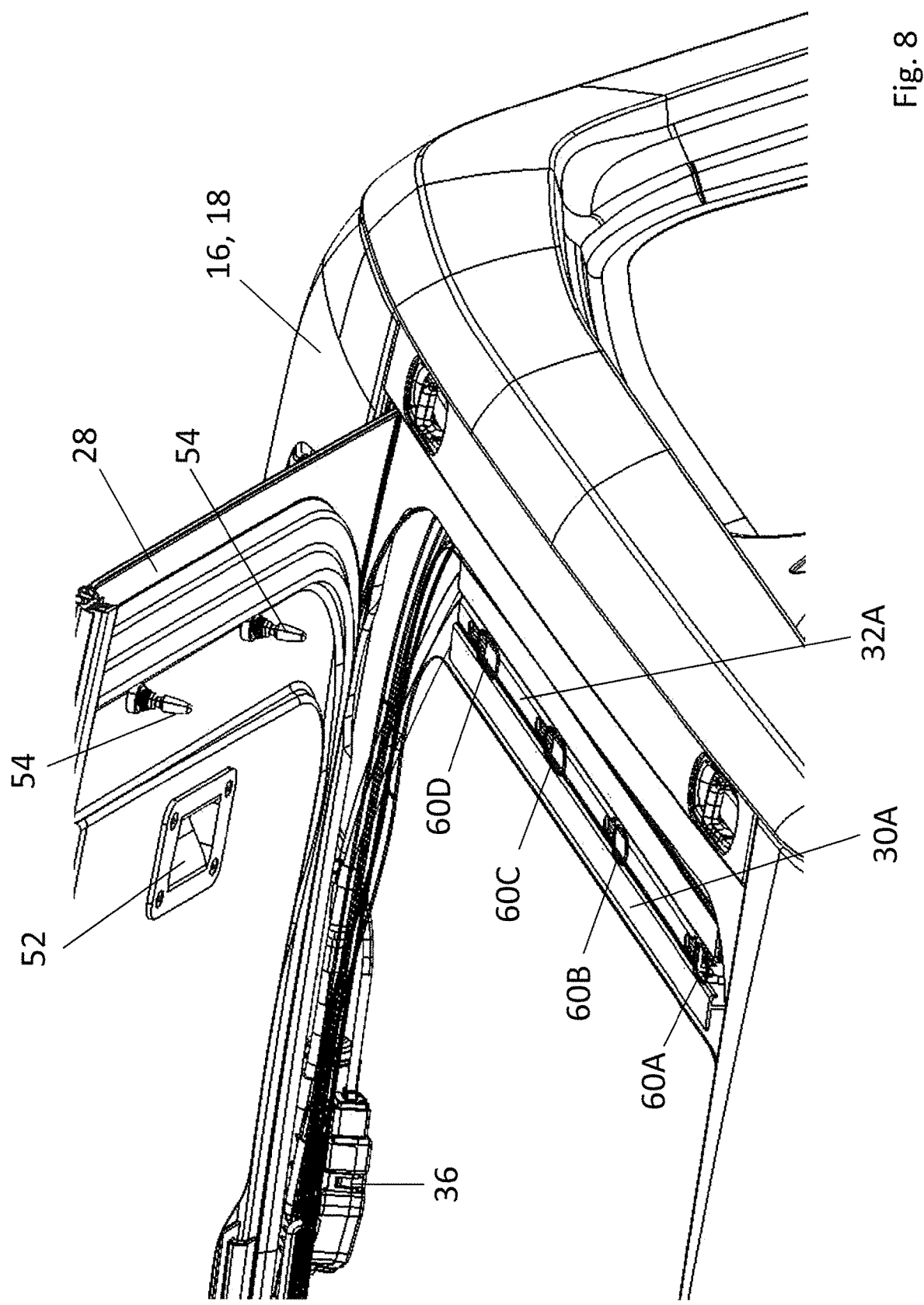
FIG. 8 is an enlarged view of a locking area for a roof panel.
Figure 9:
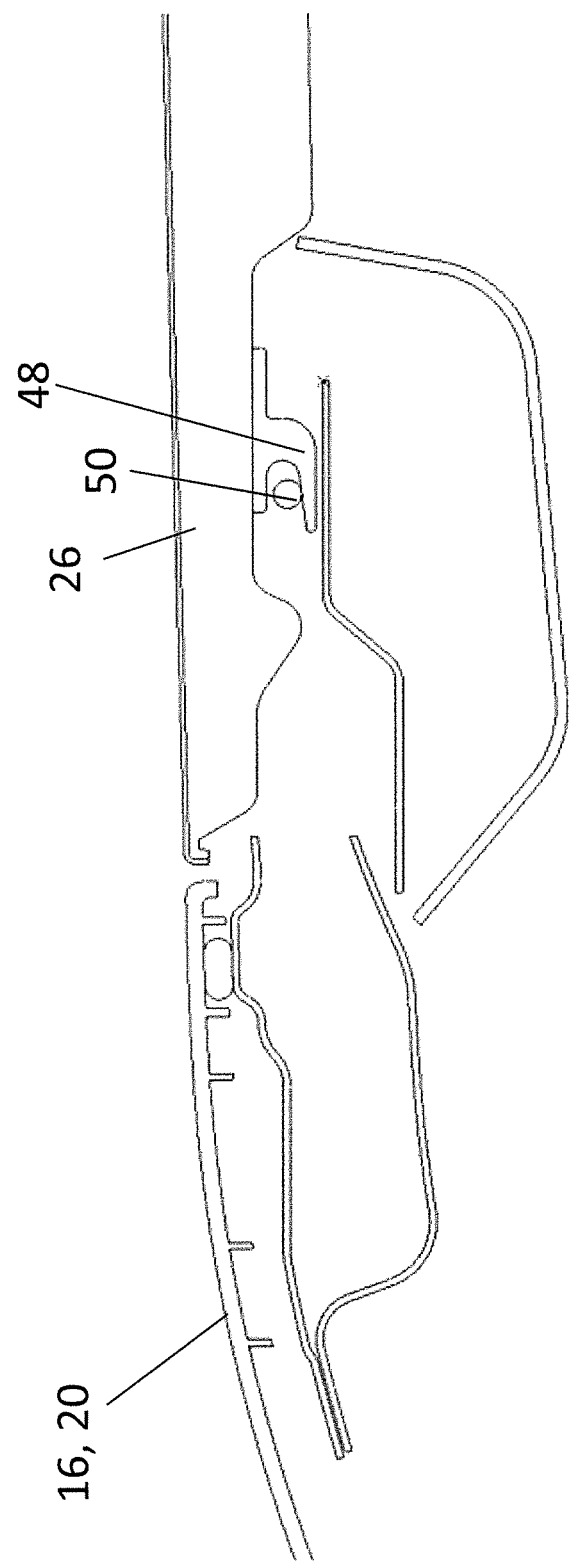
FIG. 9 is a section through the vehicle roof along line IX-IX in FIG. 1.

The drawing shows a motor vehicle 10 having a vehicle roof 12 provided with a roof opening system 14. For this purpose, vehicle roof 12 has a solid roof portion 16 which comprises a rear transverse element 18, a front transverse element 20, which forms a front header of motor vehicle 10, and two longitudinal beams 22A and 22B. Solid roof portion 16 encloses a roof opening 24 which can be selectively closed or at least partially opened by two roof panels 26 and 28, which are part of roof opening system 14. In particular, vehicle roof 12 can be configured by roof opening system 14 in such a manner that roof opening 24 is covered or closed by both roof panels 26 and 28 (FIG. 1), which corresponds to a closed position, or that roof opening 24 is partially opened by detaching roof panel 26 from solid roof portion 16 and retaining roof panel 28 on solid roof portion 16, which corresponds to a first open position (FIG. 2), or that both roof panels 26 and 28 are detached from solid roof portion 16 and roof opening 24 is completely open, which corresponds to a second open position (FIG. 3).

In addition to the two roof panels 26 and 28, roof opening system 14 has two guide rails 30A and 30B which extend along the lateral edges of roof opening 24 on either side of a vertical longitudinal center plane of the roof, and two lock slides 32A and 32B which are guided in guide rails 30A and 30B in a sliding manner. Lock slides 32A and 32B are each driven, via a drive cable arrangement 34A and 34B, respectively, by a shared drive motor 36, which is an electric motor and which is accommodated by transverse element 18 of solid roof portion 16. For driving drive cable arrangements 34A and 34B, drive motor 36 has a drive pinion which is engaged with the drive cables of drive cable arrangements 34A and 34B. The drive cables can be helix cables or flexible gear racks.

A frame 38 is provided to retain lock slides 32A and 32B in guide rails 30A and 30B, frame 38 being attached to the vehicle body and being rigidly connected to solid roof portion 16 or being part of solid roof portion 16. On its upper side, frame 38 has a circumferential sealing element 40 which interacts with the undersides of roof panels 26 and 28 when they are in the closed position. Furthermore, the rear roof panel has, on its front edge, a seal 42 which interacts with the rear edge of front roof panel 26 in the closed position.

Figure 10:
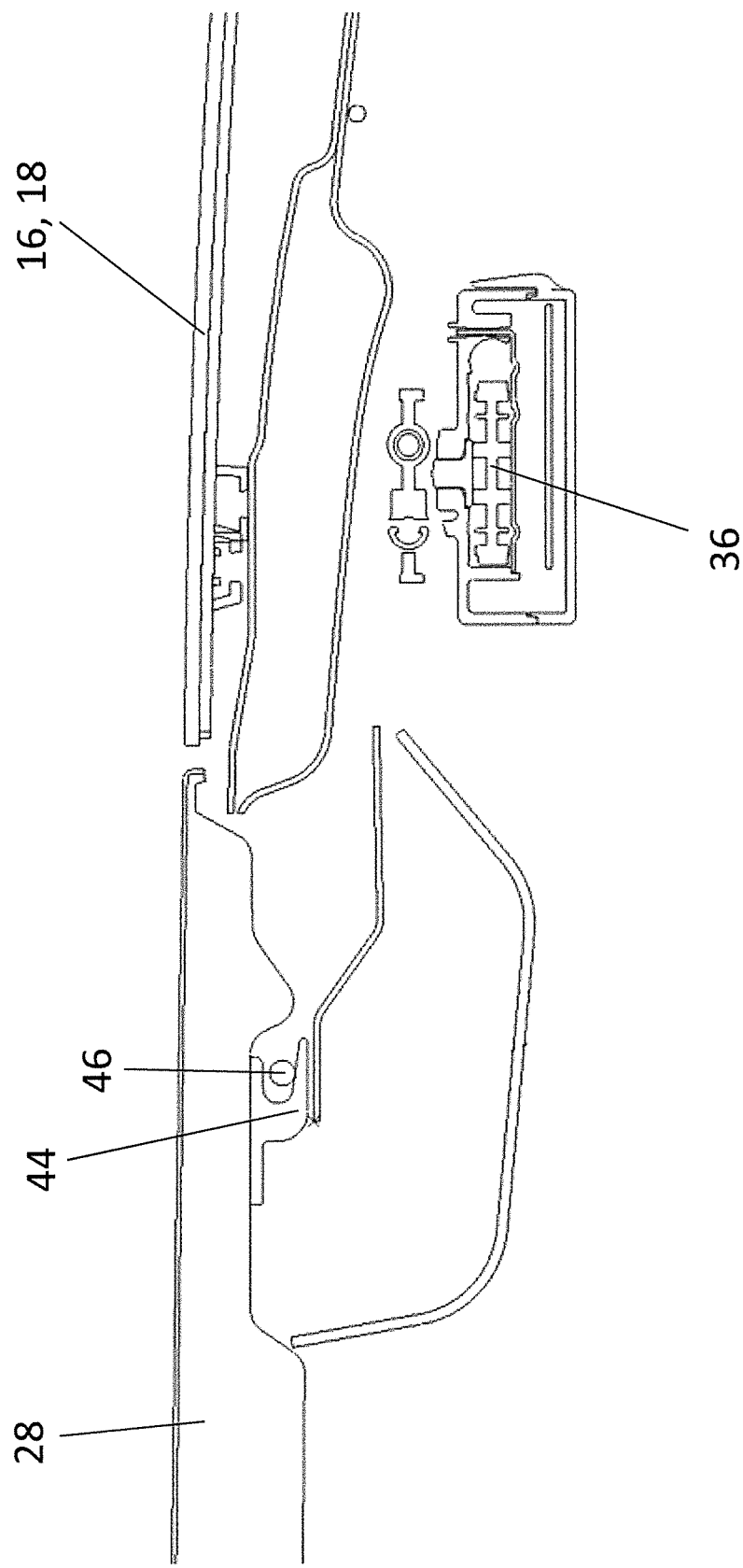
FIG. 10 is a section through the vehicle roof along line X-X in FIG. 1.
Figure 11:
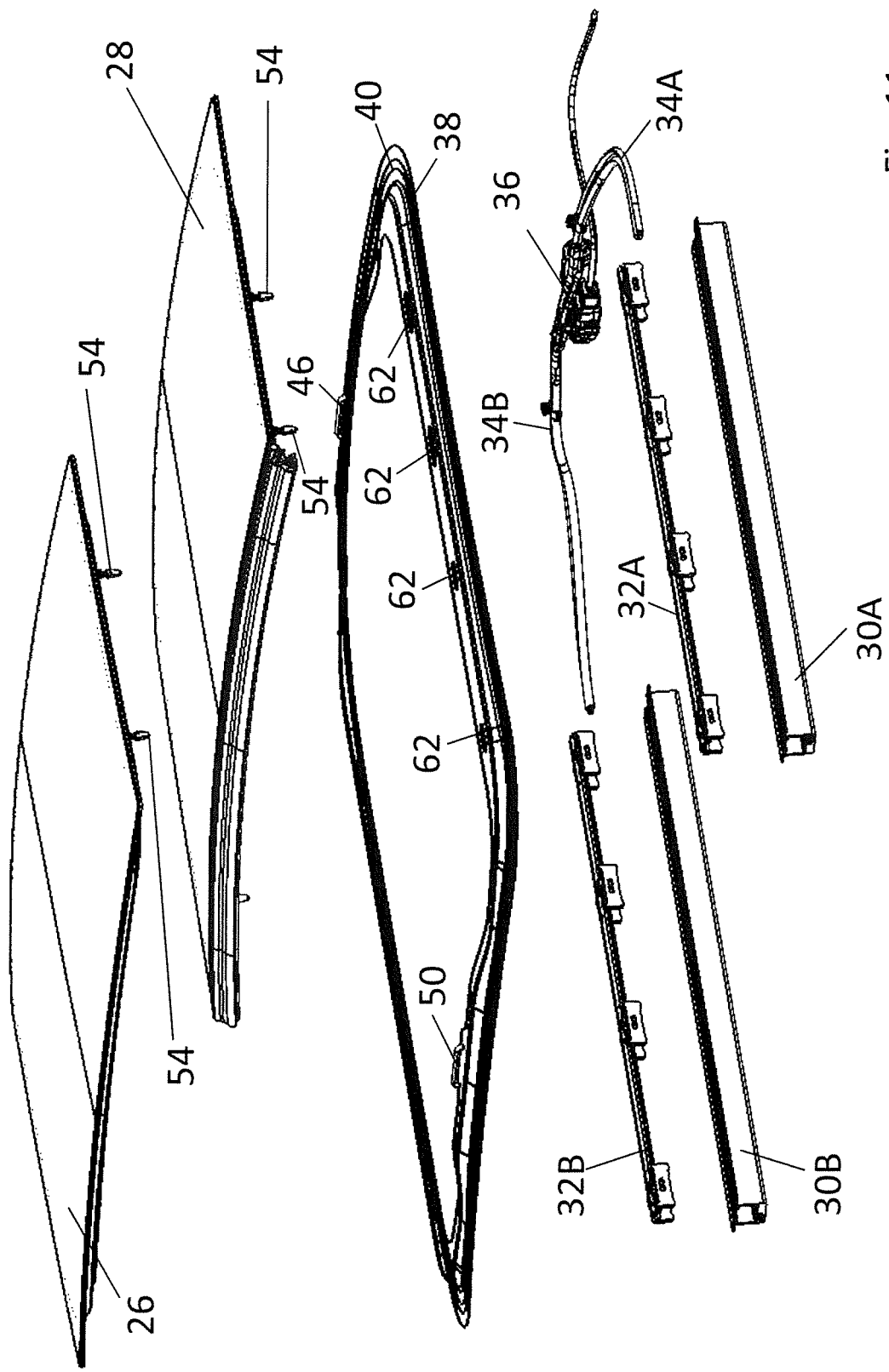
FIG. 11 shows the individual parts of the roof opening system.
Figure 12:
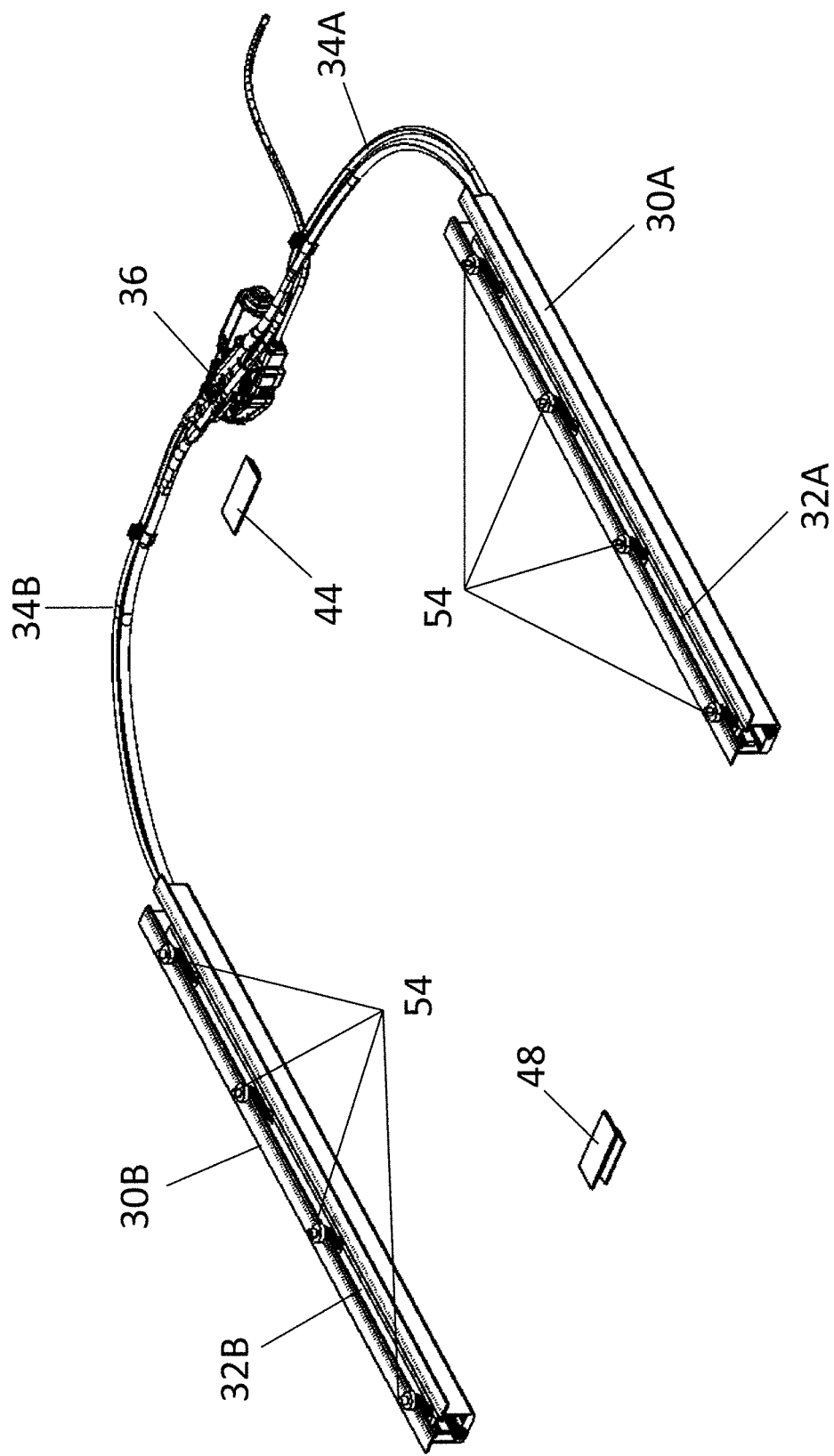
FIG. 12 shows locking kinematics for the roof modules.
Figure 13:
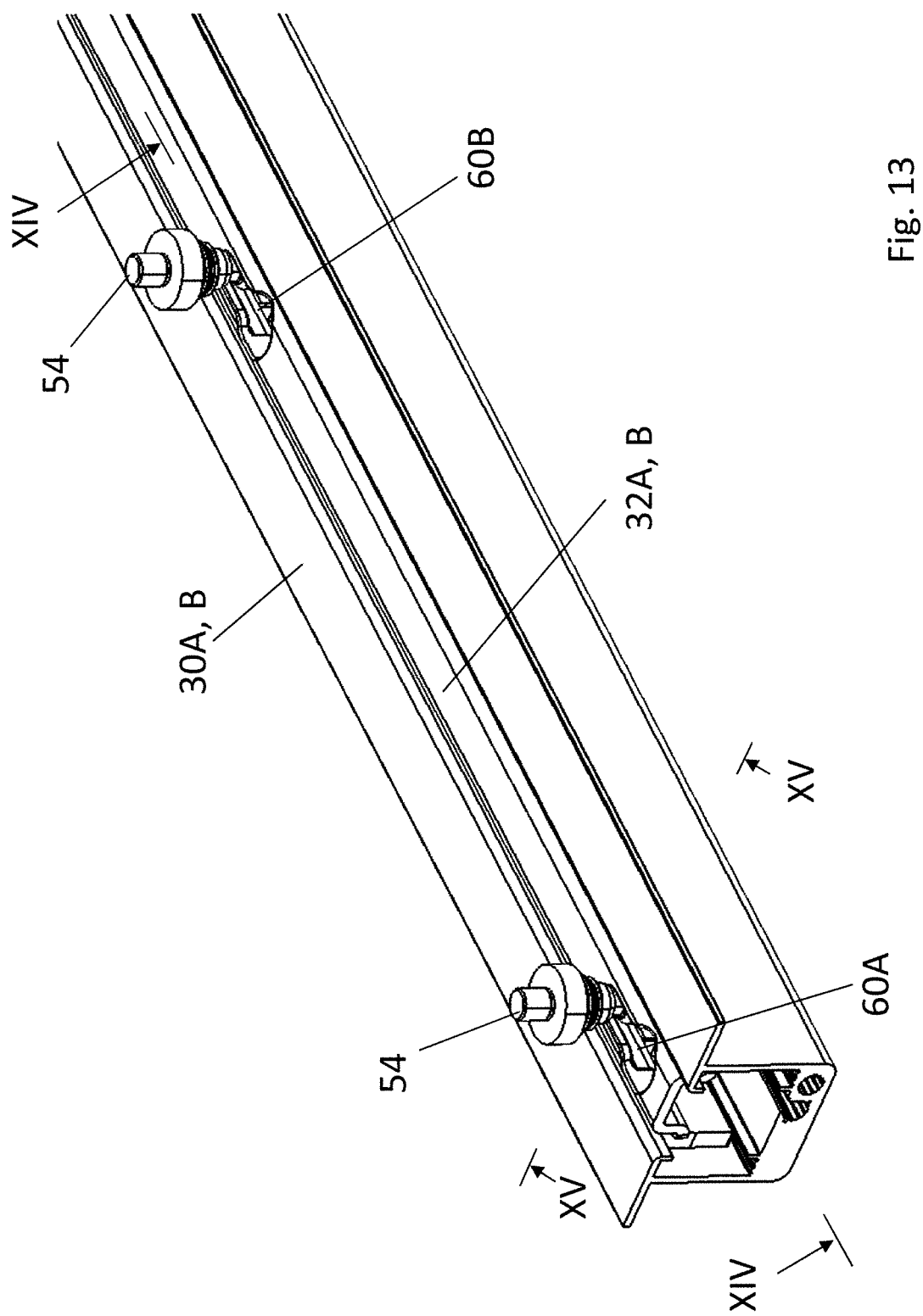
FIG. 13 shows the locking kinematics of FIG. 12 in the area of a guide rail.
Figure 14:
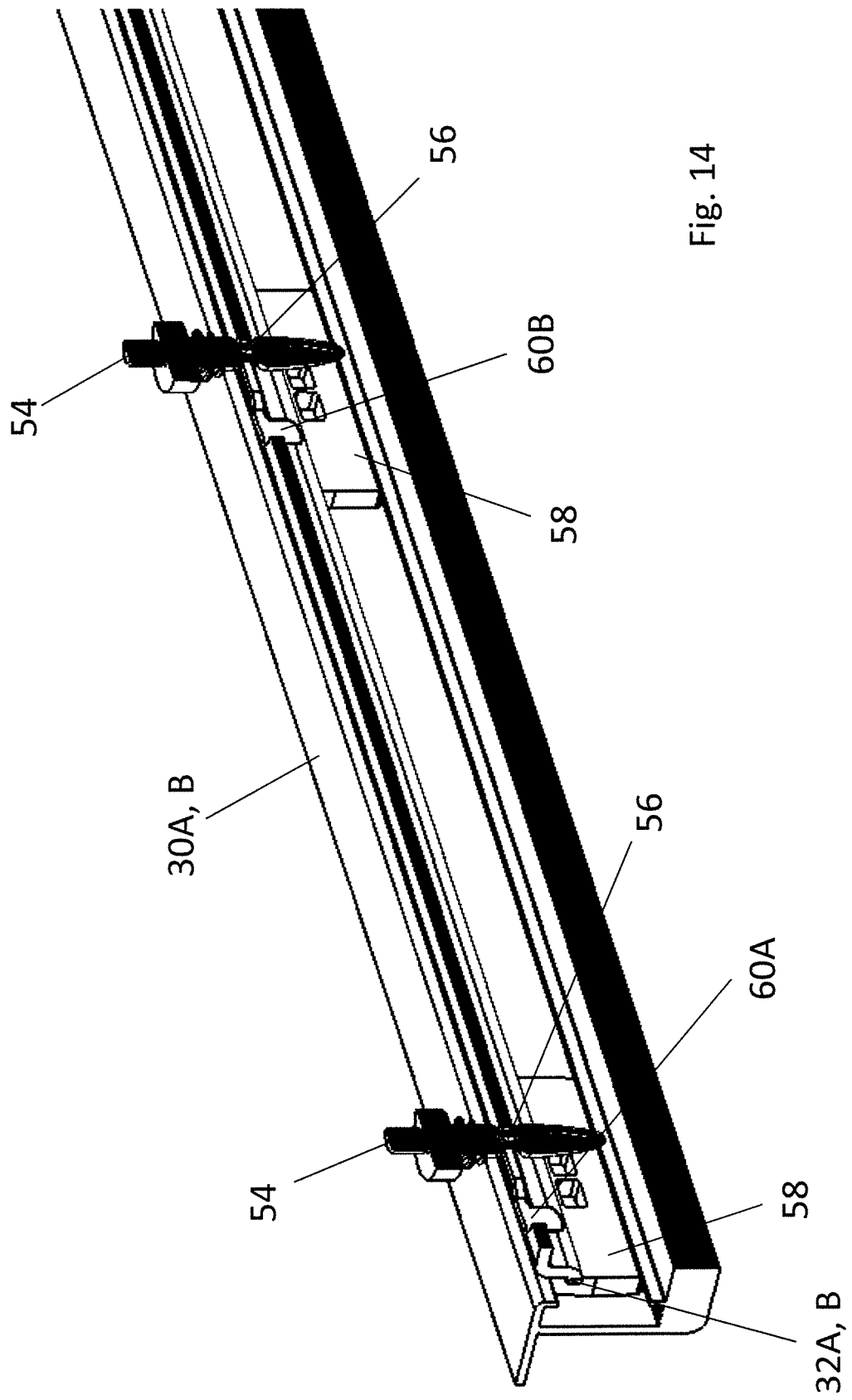
FIG. 14 is a longitudinal section through the guide rail and a lock slide along line XIV-XIV in FIG. 13.
Figure 15:
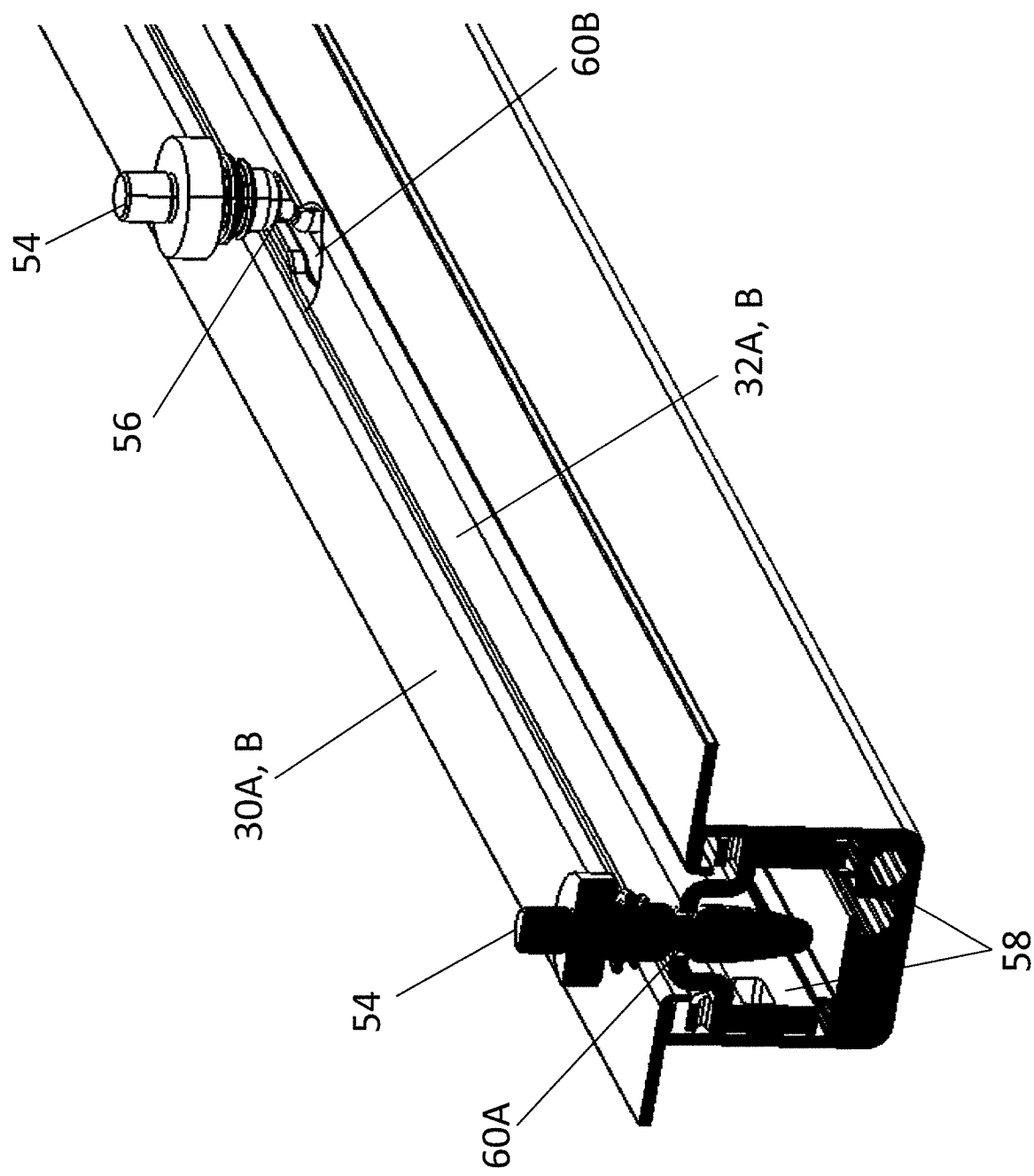
FIG. 15 is a perspective section view of the guide rail and of the lock slide along line XV-XV in FIG. 13.

In its rear edge portion in the middle of the vehicle, rear roof panel 28 has a securing bracket 44 which, as can be seen in FIG. 10, in particular, engages under a corresponding retaining section 46 formed integrally on frame 38 and thus formed on solid roof portion 16. Correspondingly, front roof panel 26 has, in its front edge portion on the underside in the middle of the vehicle, a retaining bracket 48 which engages under a retaining section 50 also formed on the solid roof portion 16 and formed by frame 38.

Additionally, each of the two roof panels 26 and 28 has, at its underside, two grip inserts 52 which facilitate manual mounting and dismounting of roof panels 26 and 28 on solid roof portion 16.

To be able to secure roof panels 26 and 28 to solid roof portion 16, roof panels 26 and 28 have, on their undersides on either side of the vertical longitudinal center plane of the roof, two locking pins 54 which each have a constriction 56.

Lock slides 32A and 32B, which are guided in guide rails 30A and 30B and each provided with eight runner elements 58, each have four keyhole-shaped recesses 60A, 60B, 60C and 60D on their upper side, the two recesses 60A and 60B interacting with locking pins 54 of front roof panel 26 and the two recesses 60C and 60D interacting with the locking pins of rear roof panel 28. In the longitudinal direction of lock slides 32A and 32B, recesses 60A, 60B, 60C and 60D each have a wide unlocking section, to which a narrow locking section is continuous. When the respective locking pins are located in the wide unlocking sections, respective locking pin 54 can be pulled out of the respective recess. When locking pins 54 engage the narrow locking sections, the respective edge portions of recesses 60A, 60B, 60C and 60D are accommodated in constrictions 56, locking pins 54 thus being secured against becoming detached from respective lock slides 32A and 32B.

Figure 16:
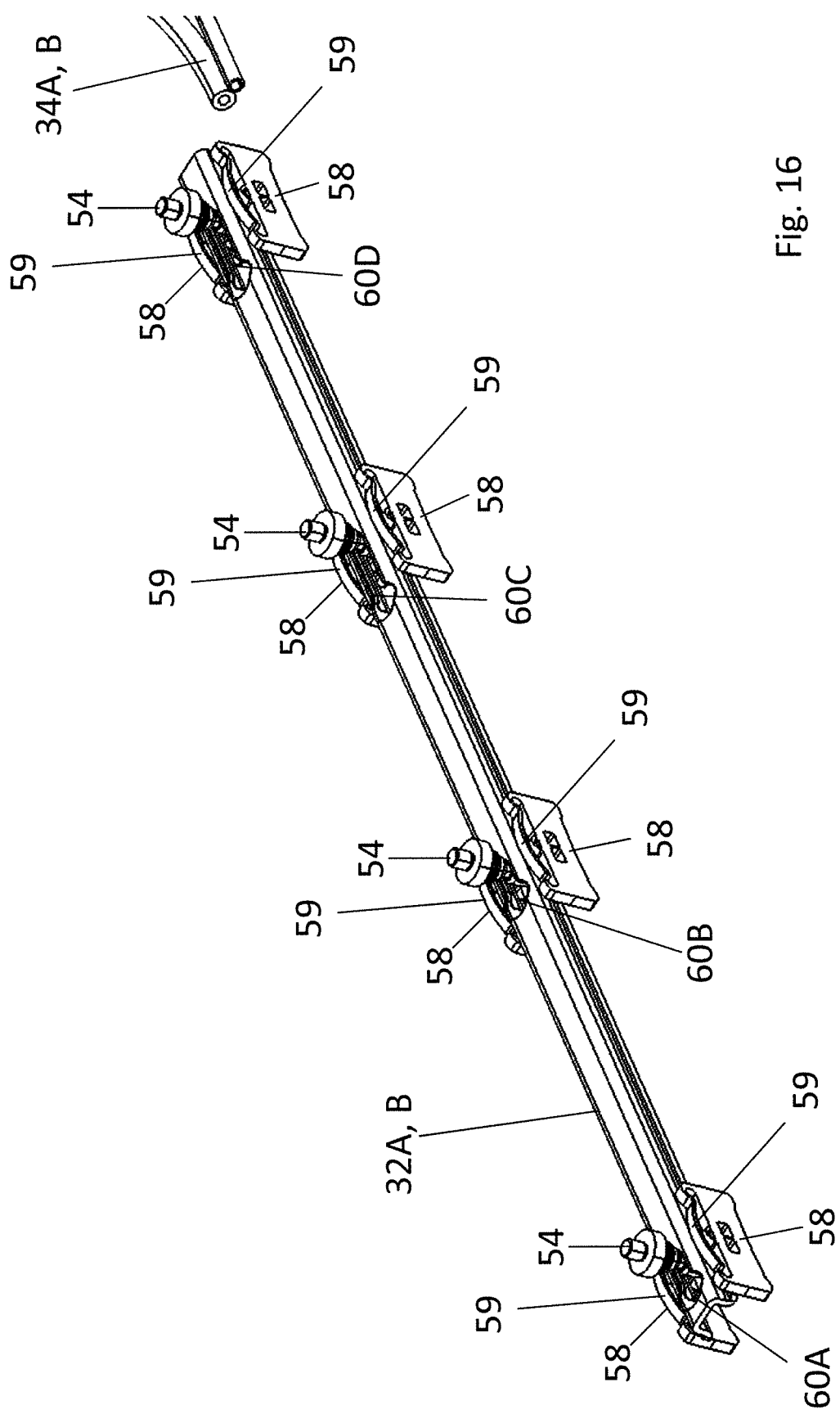
FIG. 16 shows the lock slide together with locking pins of the roof panels.
Figure 17:
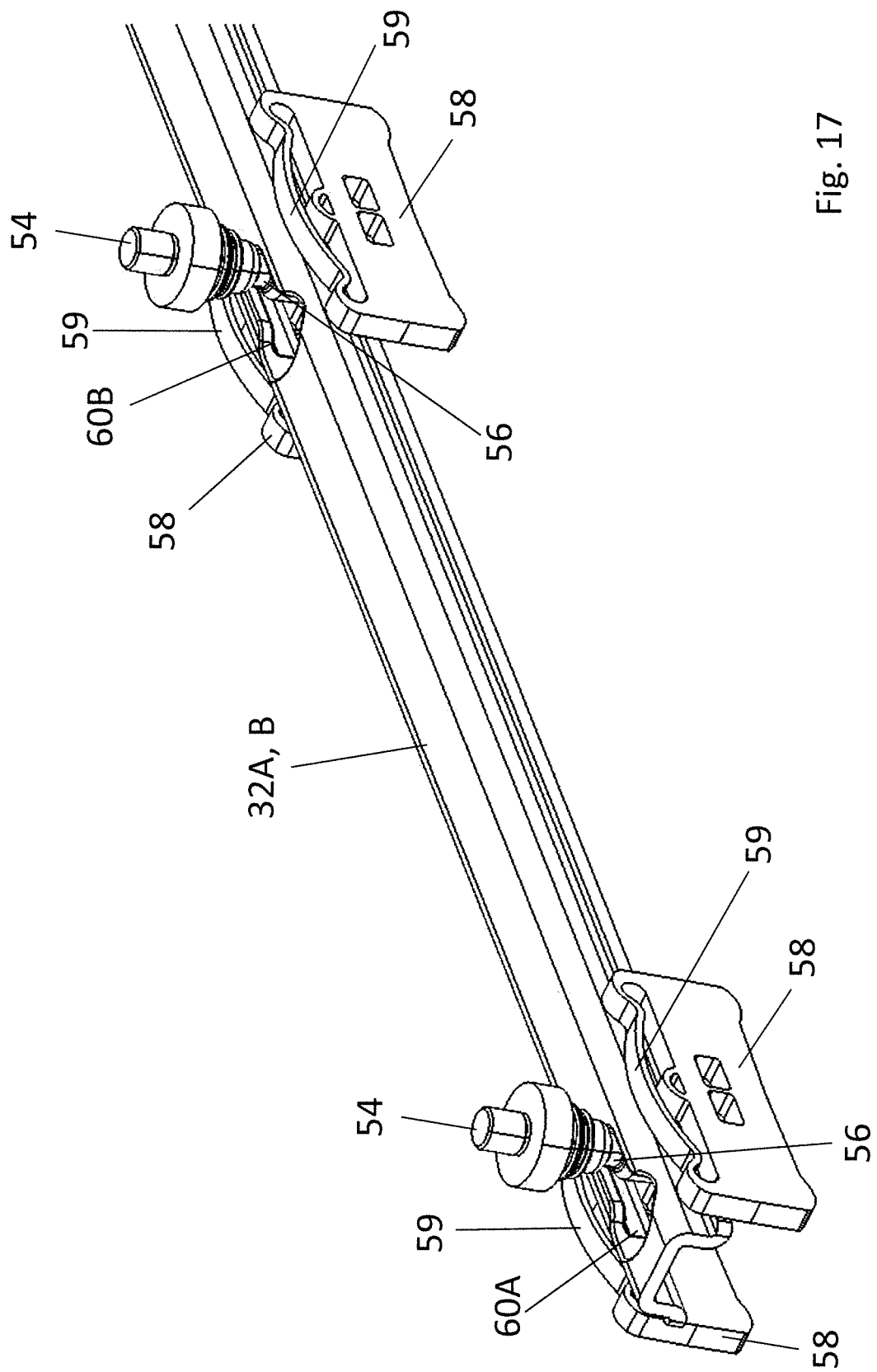
FIG. 17 shows a front portion of the lock slide.
Figure 18:
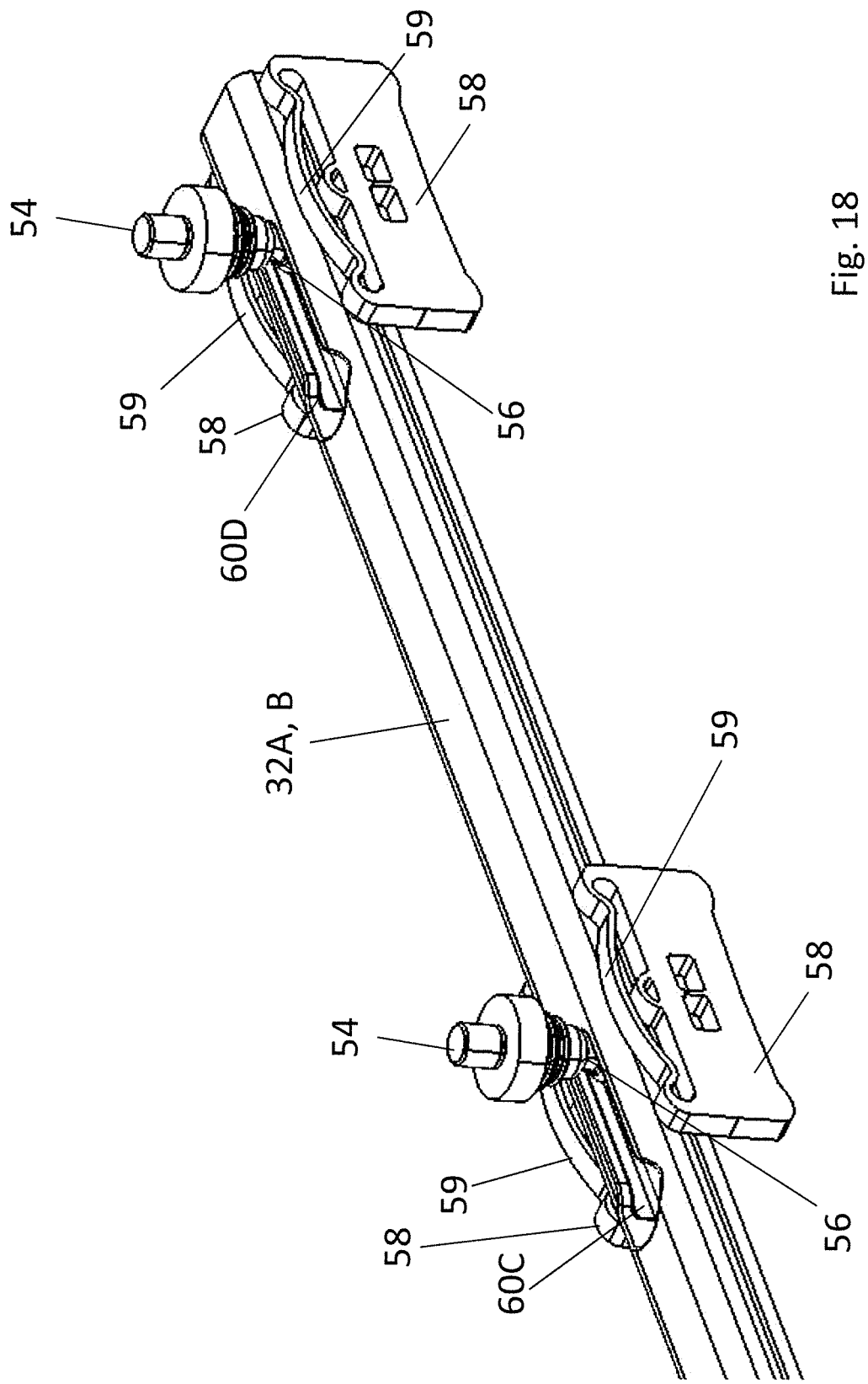
FIG. 18 shows a rear portion of the lock slide.
Figure 19:
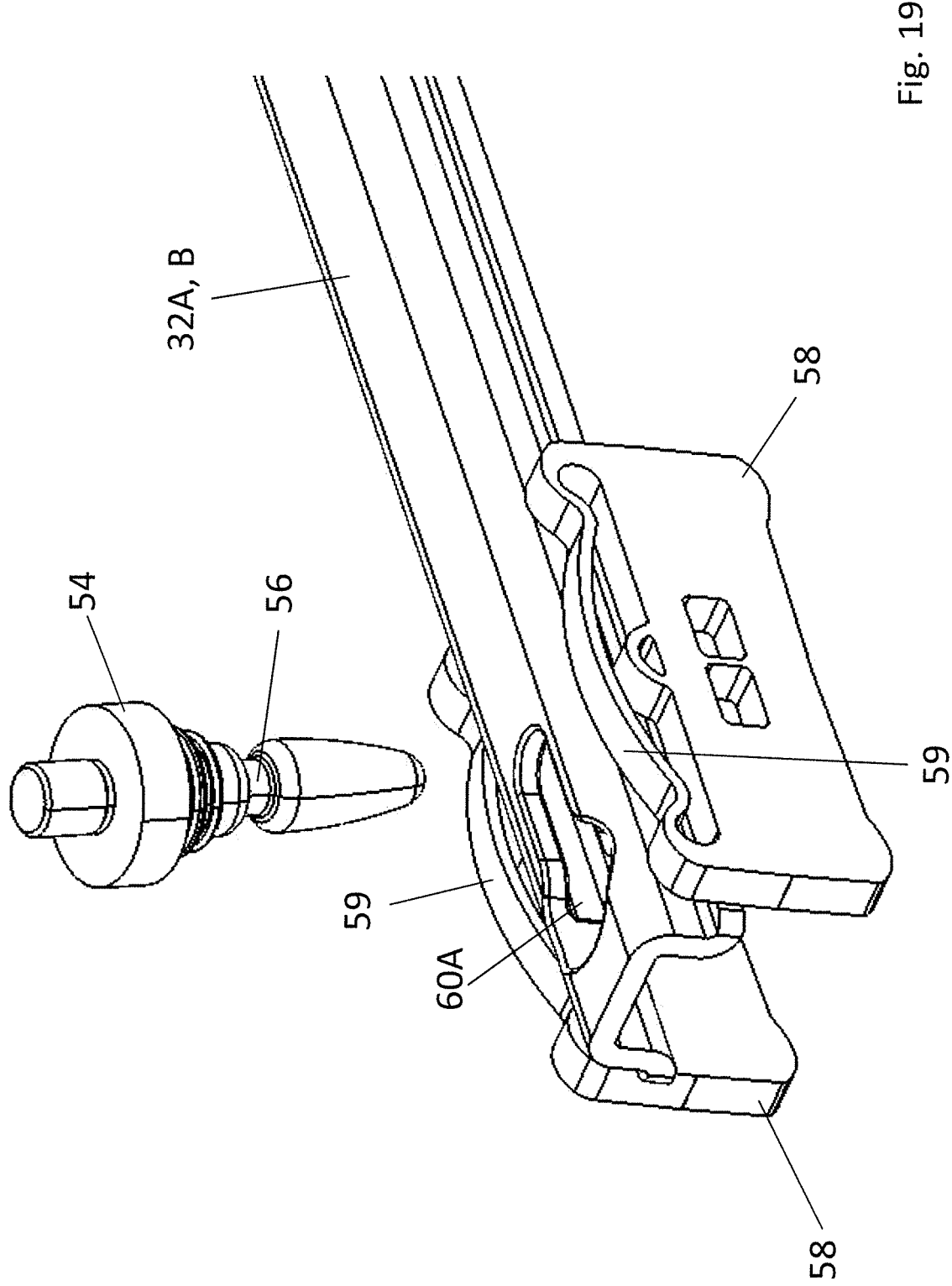
FIG. 19 shows a front portion of the lock slide during insertion of a locking pin.

In the longitudinal direction of respective lock slides 32A and 32B, the locking sections of the two front recesses 60A and 60B are shorter than the locking sections of the two rear recesses 60C and 60D. This means that, starting from the locking position, which is illustrated in FIG. 16, for example, lock slide 32A can first be displaced by a specific length of travel so that the locking pins of front roof panel 26 are located in the wide unlocking sections of front recesses 60A and 60B and front roof panel 26 can be detached from solid roof portion 16, whereas locking pins 54 of rear roof panel 28 continue to be located in the narrow locking sections of the two recesses 60C and 60D, which means that rear roof panel 28 continues to be secured to solid roof portion 16. In this way, the first open position, which is illustrated in FIG. 2, can be realized. When front roof panel 26 is removed, lock slides 32A and 32B can be displaced further so that locking pins 54 of rear roof panel 28 are also located in the unlocking sections of associated recesses 60C and 60D and rear roof panel 28 can be removed from solid roof portion 16, as well. In this way, the second open position, which is illustrated in FIG. 3, can be realized.

For locking pins 54 to be able to interact with lock slides 32A and 32B, frame 38 has four cutouts 62 on either side of the vertical longitudinal center plane of the roof, which can be engaged by locking pins 54.

Each of the runner elements 58 of lock slides 30A and 30B has an elastic bow 59 on top, allowing lock slides 30A and 30B to be guided in guide rails 30A and 30B without rattling.

The invention claimed is:

1. A vehicle roof, comprising:
   a solid roof portion attachable to the vehicle body and which delimits a roof opening, and
   at least one removable roof panel which covers the roof opening when in a closed position and which is detached from the solid roof portion when in an open position, the roof opening thus being uncovered,
   wherein the at least one removable roof panel has at least one lock element on either side of a vertical longitudinal center plane of the roof, which is parallel to the longitudinal direction of the vehicle,
   wherein each at least one lock element interacts with a respective lock slide mounted on a fixed roof portion which is movable between at least one locking position, in which each at least one lock element retains the at least one removable roof panel on the solid roof portion and the roof opening is closed by the at least one removable roof panel, and
   an unlocking position, in which the at least one removable roof panel is detachable from the solid roof portion.

2. The vehicle roof according to claim 1, wherein the respective lock slide is two lock slides which are driven by a shared drive.

3. A vehicle roof, comprising:
   a solid roof portion attachable to the vehicle body and which delimits a roof opening, and
   at least one removable roof panel which covers the roof opening when in a closed position and which is detached from the solid roof portion when in an open position, the roof opening thus being uncovered,
   wherein the at least one removable roof panel has at least one lock element on either side of a vertical longitudinal center plane of the roof,
   wherein each at least one lock element interacts with a respective lock slide which is movable between at least one locking position, in which each at least one lock element retains the at least one removable roof panel on the solid roof portion and the roof opening is closed by the at least one removable roof panel,
   an unlocking position, in which the at least one removable roof panel is detachable from the solid roof portion;
   wherein the respective lock slide is two lock slides which are driven by a shared drive; and
   wherein the shared drive is configured to drive two drive cables, each drive cable being connected to one of the two lock slides.

4. The vehicle roof according to claim 1, wherein the respective lock slide is two lock slides which are each guided in a guide rail attached to the vehicle body.

5. The vehicle roof according to claim 1, wherein each respective lock slide has at least one recess on its upper side, the respective at least one lock element of the roof panel engageable into the at least one recess when the roof panel is in its closed position.

6. The vehicle roof according to claim 5, wherein each at least one recess has a keyhole-shaped outline and comprises a locking section and an unlocking section.

7. The vehicle roof according to claim 1, wherein the at least one lock elements are each realized as a locking pin having a constriction provided with a ramp surface which interacts with the respective lock slide in such a manner that the roof panel is pulled against the solid roof portion as the respective lock slide is being moved into the locking position.

8. The vehicle roof according to claim 1, wherein the respective lock slides each have runners which are guided on a guiding surface.

9. The vehicle roof according to claim 1, wherein the roof panel further comprises a retaining tab, which engages under a section of the solid roof portion when the roof panel is in the closed position.

10. The vehicle roof according to claim 4, wherein a frame which retains the two lock slides in the guide rails is formed on the solid roof portion.

11. The vehicle roof according to claim 10, wherein the frame has cutouts which are engaged by the at least one lock elements when the roof panel is in the closed position.

12. The vehicle roof according to claim 1, wherein at least two roof panels are provided and the lock slides unlock both roof panels when in the unlocking position, retain one roof panel on the solid roof portion and unlock the other roof panel when in a first locking position and retain both roof panels on the solid roof portion when in a second locking position.

13. A motor vehicle having a vehicle roof, comprising:
   a solid roof portion which is attached to the vehicle body and which delimits a roof opening, and
   at least one removable roof panel which covers the roof opening when in a closed position and which is detached from the solid roof portion when in an open position, the roof opening thus being uncovered,
   wherein the roof panel has at least one lock element on either side of a vertical longitudinal center plane of the roof, which is parallel to the longitudinal direction of the vehicle,
   each at least one lock element interacting with a respective lock slide mounted on a fixed roof portion which can be moved between at least one locking position, in which it retains the roof panel on the solid roof portion and the roof opening is closed by the roof panel, and an unlocking position, in which the roof panel can be detached from the solid roof portion.

* * * * *